May 18, 1954 G. F. ZIFFER ET AL 2,678,965

MAGNETIC MEMORY CIRCUITS

Filed Jan. 29, 1953 2 Sheets-Sheet 1

Dashed lines are where tube 59' is cut-off

Dashed lines are where tube 59 is cut-off.

INVENTORS
Norman B. Saunders
and Garret F. Ziffer
BY
Robert J. Palmer
Attorney

May 18, 1954 G. F. ZIFFER ET AL 2,678,965

MAGNETIC MEMORY CIRCUITS

Filed Jan. 29, 1953 2 Sheets-Sheet 2

INVENTORS
Norman B. Saunders
and Garret F. Ziffer
BY
Robert T. Palmer
Attorney

Patented May 18, 1954 2,678,965

UNITED STATES PATENT OFFICE 2,678,965

MAGNETIC MEMORY CIRCUITS

Garret F. Ziffer, Cambridge, and Norman B. Saunders, Weston, Mass., assignors to American Machine & Foundry Company, a corporation of New Jersey Application January 29, 1953, Serial No. 333,856

18 Claims. (Cl. 178—17.5)

This invention relates to the conversion of pulse trains, particularly pulse trains consisting of the dots and dashes of telegraph code, into binary digits, and the insertion of the binary digits into magnetic shift registers.

A feature of this invention is that at the ends of code groups, the shift register is returned to its normal state.

Code groups when transmitted in International Morse Code, consist of dots and dashes, the former being one-third the duration of the latter. The spacing between dots and/or dashes equals the duration of a dot within a code group, and is three or more times that duration between code groups. In the International Morse Code, a U consists of two dots followed by a dash. An N consists of a dash followed by a dot. Considering dots as "zeros" and dashes as "ones" in a binary system, UN may be represented as the two binary numbers 001 and 10.

This invention converts such code groups into binary digits, and stores the digits in a magnetic shift register from which they can subsequently be decoded.

Magnetic binary shift registers are fully described in an article by An Wang and Way Dong Woo on pages 49–50 of volume 21, the January 1950 issue of the Journal of Applied Physics. It is believed, therefore, that it is not necessary in the present disclosure to give more than the following brief description of magnetic binaries and shift registers employing same.

A magnetic binary is a circuit element including a magnetic core having a rectangular hysteresis loop of low coercive force, and shift, input and output windings on the core. The core is capable of being magnetized to saturation in either of two directions. Two states are said to arise from the two directions: a positive or active state in which the direction of retentivity is opposite to that which would result from the application of a shift or sensing pulse to the shift winding, and a negative or inactive state in which the direction of retentivity is the same as that which would result from the application of a shift pulse. When applied to a core in the active state, a shift pulse will cause the inactive state to appear. When applied to a core already in the inactive state, a shift pulse will cause no change in state.

A core in the active or positive state is said to contain the digit "one," and a core in the negative or inactive state is said to contain the digit "zero." A single bit of information is called a "baud." When a core shifts from one state to the other, a voltage will be induced in its output winding. A shift pulse will have no substantial effect on a core in the inactive state, and substantially no voltage will be induced in its output winding.

A magnetic binary shift register has a line of storage cores and another line of temporary storage cores. If a "one" is stored in the first storage core, the application of a shift current pulse to the line of storage cores will cause a voltage to be induced in the output winding of the first storage core and supplied into the input winding of the first temporary storage core, causing the "one" to be transferred to the first temporary storage core. The application of a shift pulse to the line of temporary storage cores will cause the "one" to be transferred to the second storage core, and so on. One cycle of operation thus consists of pulsing first the storage line, and then the temporary storage line. At the end of each cycle the "one" has been advanced one stage.

Normally the shift register of this invention is cleared of all information. The incoming code signals are converted into rectangular pulses. The first in a series of pulses inserts, depending upon whether it is a dot or a dash, a "zero" or a "one" in the first temporary storage core. The trailing edge of this pulse causes this information to be transferred to the first storage core. The leading edge of the next signal pulse will cause the same information to be shifted to the second temporary storage core, and the first core is ready to receive the next digit. The whole register can thus be filled with dots and dashes in the form of binary digits.

If succeeding signal pulses are separated by an interval representing the space between code groups, the entire register will automatically be reset to its original, cleared condition.

An object of this invention is to convert code signals into binary digits, and to insert such digits into a magnetic shift register.

Another object of this invention is to convert code signals into binary digits, to insert such digits into a shift register, and to clear the register at the end of a code group.

The invention will now be described with reference to the drawings, of which:

Figure 1A:
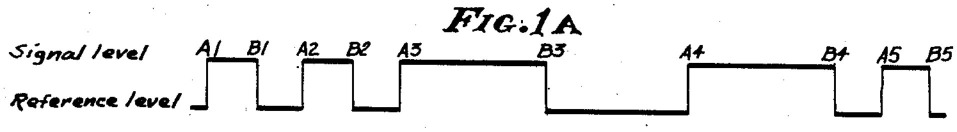
Fig. 1A is an illustration of the code group UN in International Morse Code, shaped to have a rectangular wave form.

Code pulses derived from a radio receiver or other source, are fed to a conventional pulse shaper 10 where they are squared-up and made constant in amplitude. The output of the pulse shaper will appear similar to the pulse train of Fig. 1A where the first two pulses, reading from left to right, are the two dots of the letter U, while the third pulse is the dash of the letter U. The fourth pulse is the dash of the letter N, and the fifth pulse is the dot of the letter N.

The control grid of the tube 11 is biased negatively through the resistor 12 connected to ground, and the resistor 13 connected to a negative terminal (—C) of a conventional bias voltage source which is not illustrated. The cathode of the tube 11 is connected to —C through the resistor 14, and is connected directly to the control grid of the tube 15, the cathode of which is grounded. Normally the tube 15 is cut-off. The plate of the tube 11 is connected through the resistor 16 to the positive terminal (B+) of a conventional plate voltage source which is not illustrated. The plate of the tube 15 is connected to the shift current bus 17, and in series with the shift windings 21, 20, 19 and 18 of the magnetic binary cores 25, 24, 23 and 22 respectively, of the top row of cores of a shift register, to B+.

The output of the pulse shaper 10 is connected through the coupling capacitor 26 and the resistor 27 to the grid of the tube 11. As a pulse leaves the shaper, its leading edge indicated as A1, A2, A3, A4 or A5 in Fig. 1A, will be differentiated by the capacitor 26 and the resistor 12 so that it will appear as a positive spike as illustrated by Fig. 1E, at the control grid of the tube 11, causing its plate current to increase, and its cathode and the grid of the tube 15 to be driven positive. This will cause the tube 15 to conduct and to supply a shift pulse through the shift windings 18, 19, 20 and 21 of the top row of cores. This shift pulse will clear the top row of cores which are storage cores, and will shift any information stored therein to the bottom row of cores which are temporary storage cores.

The shift current pulses are provided with rounded front edges by the resistor 27 and the capacitor 32, which reduce the rate of change of flux which ordinarily would produce large "zero" signal voltages caused by air coupling between the shift and output windings on the cores. This action is fully described in the copending application of Frank A. Browne, Jr., Serial No. 294,515, filed June 19, 1952, now U. S. Patent No. 2,654,080, dated September 29, 1953. The resistor 16 through its limiting action on the plate current of the tube 11 which through the cathode follower connection limits the plate current of tube 15, limits the amplitude of the shift pulses.

The core 28 has an output winding 33 connected through the diode 34 to the input winding 35 on the core 22. The core 22 has an output winding 36 connected through the diode 37 to the input winding 38 of the core 29. The core 29 has an output winding 39 connected through the diode 40 to the input winding 41 on the core 23. The core 23 has an output winding 43 connected through the diode 44 to the input winding 45 on the core 30. The core 30 has an output winding 46 connected through the diode 47 to the input winding 48 on the core 24. The core 24 has an output winding 49 connected through the diode 50 to the input winding 51 on the core 31. The core 31 has an output winding 52 connected through the diode 53 to the input winding 54 on the core 25. The core 25 has an output winding 55 connected through the diode 56 to the next core in order, or to the output of the shift register. As many cores may be provided as are necessary for storing a desired number of binary digits.

Figure 1B:
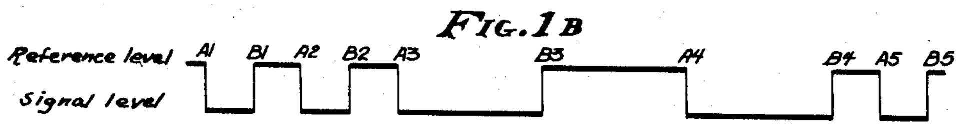
Fig. 1B is Fig. 1A inverted.

The output of the pulse shaper 10 is also connected to the phase inverter 57 which inverts the incoming code pulses as illustrated by Fig. 1B. The inverted pulses have the leading edges B1, B2, B3, B4 and B5 which, before inversion, were the trailing edges of the pulses as shown by Fig. 1A. The inverted pulses are applied through the coupling capacitor 26' and the resistor 27' to the control grid of the tube 11' the cathode of which is connected through the resistor 14' to —C and to the grid of the tube 15'.

As in the case of tube 11, the tube 11' is biased negatively through the resistor 12' connected to ground, and the resistor 13' connected to —C. The tube 15' is normally cut-off, and its plate is connected through the shift current bus 17' and the series connected shift windings 18', 19', 20' and 21' of the bottom row of cores, to B+.

Figure 1C:
Fig. 1C is a graph of the voltages at the control grid of the tube 59' of Fig. 2.
Figure 1D:
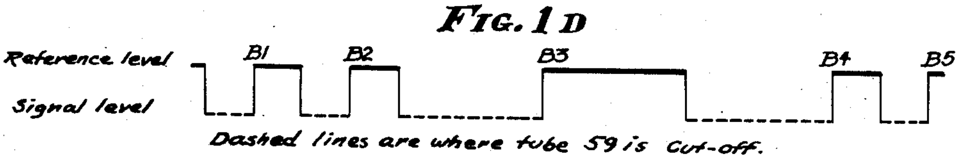
Fig. 1D is a graph of the voltages at the control grid of the tube 59.
Figure 1E:
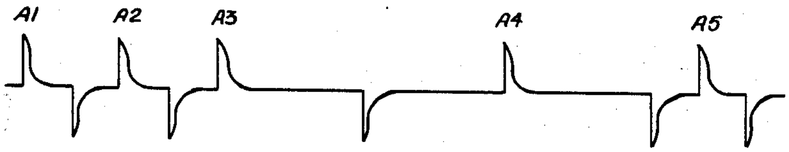
Fig. 1E is a graph of the voltages at the control grid of the tube 11 of Fig. 2.
Figure 1F:
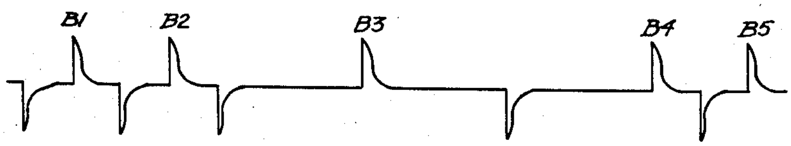
Fig. 1F is a graph of the voltages at the control grid of the tube 11' of Fig. 2.

As a pulse leaves the inverter 57, its leading edge indicated as B1, B2, B3, B4 or B5 on Fig. 1B will be differentiated by the capacitor 26' and the resistor 12' so that it will appear as a positive spike as illustrated by Fig. 1F, at the grid of the tube 11' causing its plate current to increase, and its cathode and the grid of the tube 15' to be driven positive, causing the tube 15' to conduct and to supply a shift pulse through the shift windings 18', 19', 20' and 21' of the bottom row of cores. This shift pulse will clear the cores of the bottom row, and will shift any information stored therein to the cores of the top row. The resistor 16' limits the amplitude of this shift pulse.

It will have been noted from the foregoing that the shift pulse generator comprising the tubes 11 and 15 supplies a shift pulse to the top row of cores when the leading edge of each code signal appears, and that the shift pulse generator comprising the tubes 11' and 15' supplies a shift pulse to the bottom row of cores when the trailing edge of each code signal appears.

The negative voltage spikes shown by Figs. 1E and 1F have no effect upon the conductance of tubes 11 and 11' respectively, since normally their control grids are biased negatively.

The tube 59 has its control grid connected through the coupling capacitor 60 to the output of the phase inverter 57, and through the resistor 61 to ground. The plate of the tube 59 is connected through the resistor 62 to B+, and to the control grid of the tube 63. The cathode of the tube 59 is connected through the resistor 64 to ground, and through the resistor 65 to —C. The tube 59 normally is conducting with its plate only a few volts above its cathode.

The control grid of the tube 63 is connected through the capacitor 69 to ground. Its cathode is also connected to ground. Its plate is connected through the resistor 67 and the input winding 68 on the core 28 to B+. The tube 63 is normally cut-off.

An incoming code signal will appear as a negative pulse at the output of the phase inverter 57 and will be supplied to the control grid of the tube 59 and will cut-off the latter for the duration of the pulse. When tube 59 is cut-off, the capacitor 69 will charge towards B+ through the resistor 62, and will cause the tube 63 to conduct. The time constant of the capacitor 69 and the resistor 62 and the relative voltages are such that the tube 63 will start to conduct when tube 59 is cut-off for a duration greater than twice the duration of a dot. The tube 63 will remain cut-off if the incoming signal is a dot but will conduct during the last portion of a signal pulse if the pulse is a dash. At the trailing edge of the pulse, tube 59 again conducts, and the capacitor 69 is rapidly returned to its original charge.

When tube 63 conducts, it draws current through the input winding 68 on the core 28. This will cause a "one" to be inserted into the core 28 when the incoming code signal is a dash. At the trailing edge of the code signal, core 28 will be cleared by the action of tubes 11′ and 15′ as previously described, and the "one" will be shifted to the core 22. When the code signal is a dot, the trailing edge of the signal will appear before the tube 63 can conduct, and a "zero" will be transferred to the upper core 22 when core 28 is cleared.

It will be apparent from the foregoing that the tubes 59 and 63 and their circuit components store "ones" and "zeros" in the shift register when the incoming code signals are dashes and dots respectively.

The tubes 59′ and 63′ operate somewhat similar to tubes 59 and 63 respectively, but are fed from the pulse shaper 10, and are sensitive to the spaces between code signals. The control grid of tube 59′ is connected through the coupling capacitor 60′ to the pulse shaper 10, and through the resistor 61′ to ground. The cathode of tube 59′ is connected through the resistor 64′ to ground and through the resistor 65′ to —C. Its plate is connected through the resistor 62′ to B+ and directly to the control grid of tube 63′. The grid of tube 63′ is connected through the capacitor 69′ to ground. Its plate is connected through the resistor 67′ to the shift bus 17′. The tube 59′ normally is conducting, and the tube 63′ normally is cut-off.

When the trailing edge of a signal pulse appears as shown in Fig. 1C, a voltage drop from signal level to reference level occurs and is impressed upon one side of the coupling capacitor 60′ at a time, for example B1. As the grid of the tube 59′ goes negative with respect to its cathode, the resistance between the grid and cathode within the tube becomes very large. Therefore, the negative voltage applied by the capacitor at the time B1, to the grid of tube 59′, is impressed across the conductance of only resistor 61′. The time constant of capacitor 60′ and resistor 61′ is relatively large so that the grid of tube 59′ remains negative until the time A2. The tube 59′ is thus cut-off between code signals, and conducts only during code signals.

When tube 59′ is cut-off, the capacitor 69′ will charge towards B+ through the resistor 62′. The time constant of the resistor 62′ and the capacitor 69′, and the relative voltages, are such that the tube 63′ will remain cut-off if the space between two code signals, one following the other, is the width corresponding to a dot, but will conduct if the space is greater than the width corresponding to two dots. When tube 63′ conducts, it draws current through the shift windings 18, 19, 20 and 21 of the upper row of cores, clearing such cores. The resistor 67′ however, so limits the magnitude of this current that the cores of the upper row are shifted by it so slowly that the rate of change of flux is insufficient to induce sufficient voltage in the output windings of the upper row of cores to shift the information stored in such cores, to the cores of the lower row. At this time there will be no information stored in the cores of the lower row. Thus a space between signal pulses in excess of two dot widths, indicates to tubes 59′ and 63′ that a code group has ended, so that these tubes act to reset the register to its original condition in which no information was stored in the register.

*Summary of operation*

Normally the shift register is cleared of all information. The first in a series of signal pulses actuates the tubes 59 and 63 to insert, depending upon whether the first pulse is a dot or a dash, a "zero" or a "one" into the first core 28 of the bottom row of cores. The trailing edge of this pulse will cause tubes 11′ and 15′ to shift this information into the first core 22 in the top row of cores.

The leading edge of the second signal pulse will cause the tubes 11 and 15 to shift this same information from the first core 22 in the top row, into the second core 29 in the botom row, so that the first core 28 in the bottom row is ready to receive the second digit. The second signal pulse actuates the tubes 59 and 63 to insert, depending upon whether the second signal pulse is a dot or a dash, a "zero" or a "one" into the first core 28 of the bottom row. The trailing edge of the second pulse will cause the tubes 11′ and 15′ to shift this information into the first core 22 in the top row.

The trailing edge of the second signal pulse actutates the tubes 11′ and 15′ to clear the bottom row of cores, causing the information stored in the second core 29 in the bottom row to be shifted into the second core 23 in the top row. This continues until all of the digits of a code group have been received and stored in the register, at which time the space interval longer than the duration of two dots will cause the tubes 59′ and 63′ to reset the register to its orignal condition, ready to receive the next code group.

Figure 2:
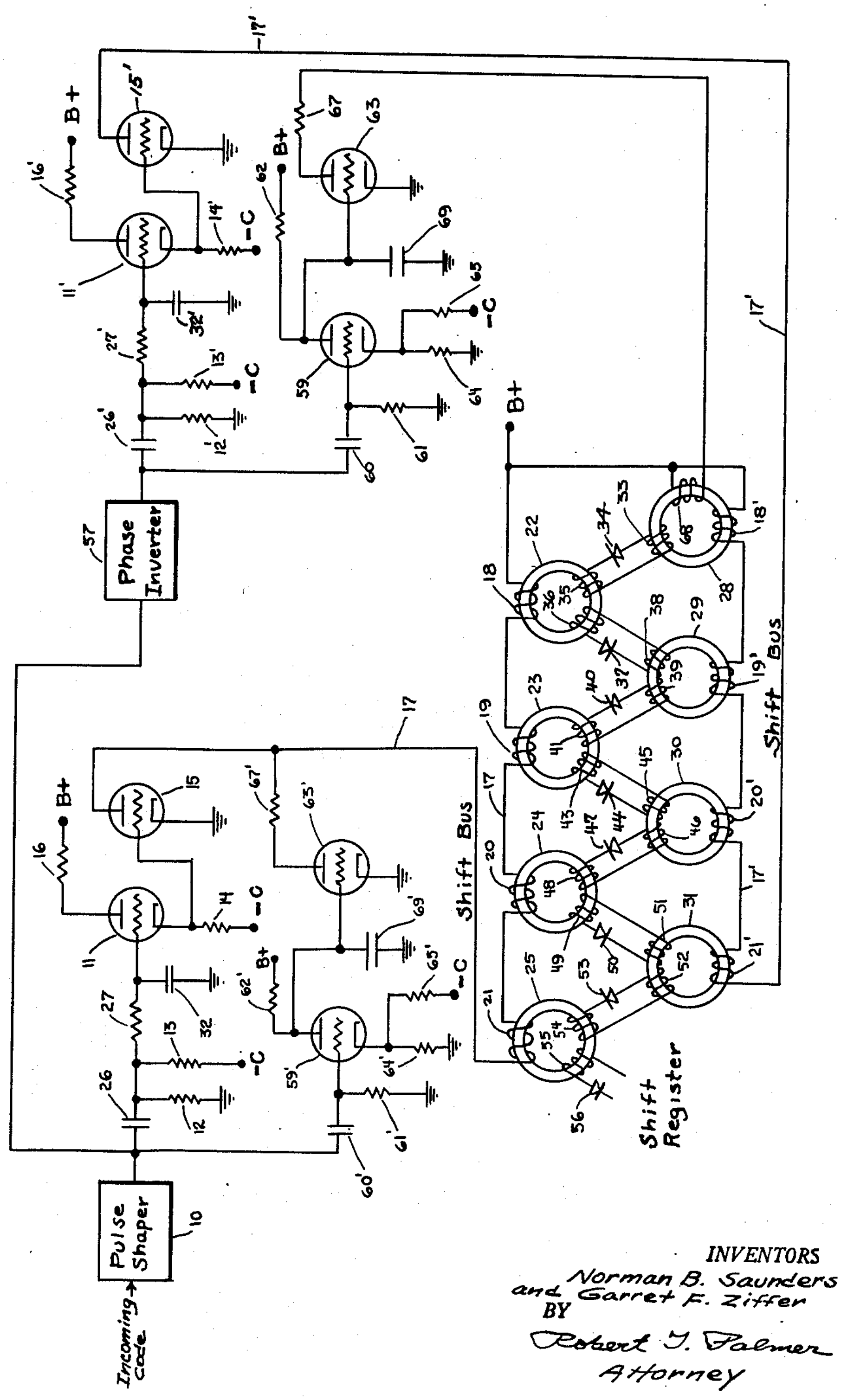
Fig. 2 is a circuit schematic including a magnetic binary shift register and circuit components for inserting code groups such as that of Fig. 1A into the shift register, and for clearing the register at the end of a code group.

The four tubes illustrated in Fig. 2 may be two dual triodes. They may be replaced by their functional equivalents "Transistors." All such devices are electronic amplifiers having control electrodes, cathodes or electron emitters, and anodes or electron collectors.

Fig. 2 of the drawing is a circuit schematic only, and is not intended to illustrate the construction of the binary cores or the physical arrangement of the windings thereon. The proper polarities of the windings and the directions in which they should be wound will be apparent to those skilled in shift register circuitry.

Different features of the invention can, of course, be used separately as well as in combination.

What is claimed, is:

1. Code storage apparatus comprising a magnetic binary shift register having a line of storage cores and a line of temporary storage cores, shift windings on said cores, means actuated by the leading edge of a code signal for supplying a shift current pulse through the shift windings on the cores of one of said lines, and means actuated by the trailing edge of the same code signal for supplying a shift current pulse through the shift windings on the cores of the other of said lines .

2. Code storage apparatus as claimed in claim 1 in which one of the cores of said other of said lines has an input winding, and in which means actuated by said trailing edge of said code signal supplies a current pulse through said input winding for inserting a "baud" in said one core.

3. Code storage apparatus comprising a magnetic shift register having a line of storage cores and a line of temporary storage cores, shift windings on said cores, means actuated by the leading edge of a code signal for supplying a shift current pulse through the shift windings on the cores of one of said lines, means for inverting the same code signal, and means actuated by the leading edge of the inverted signal for supplying a shift current pulse through the shift windings on the cores of the other of said lines.

4. Code storage apparatus as claimed in claim 3 in which one of the cores of said other of said lines has an input winding, and in which means actuated by said leading edge of said inverted signal supplies a current pulse through said input winding for inserting a "baud" in said one core.

5. Code storage apparatus comprising a magnetic shift register having a line of storage cores and a line of temporary storage cores, shift windings on said cores; a first electronic amplifier having an anode connected to the shift windings on the cores of one of said lines, and having a cathode and a control electrode; a second electronic amplifier having an anode connected to the shift windings on the cores of the other of said lines, and having a cathode and a control electrode; a third electronic amplifier having a cathode connected to said control electrode of said first amplifier, and having a control electrode; a fourth electronic amplifier having a cathode connected to said control electrode of said second amplifier, and having a control electrode; means for providing a positive voltage spike at the leading edge of a code signal and for feeding said spike to said control electrode of said third amplifier, and means for providing a positive spike at the trailing edge of said code signal and for feeding said last mentioned spike to said control electrode of said fourth amplifier.

6. Code storage apparatus as claimed in claim 5 in which the means for providing the positive spike at the trailing edge of the signal, includes means for inverting the code signal and for providing the last mentioned spike at the leading edge of the inverted signal.

7. A magnetic shift register comprising a line of storage cores, a line of temporary storage cores, shift windings on said cores, a first shift pulse generator connected to the shift windings on the cores of one of said lines, a second shift pulse generator connected to the shift windings on the cores of the other of said lines, and means responsive to signal voltages for actuating said generators to pulse first one of said lines, and to pulse next the other of said lines, said means including means for providing voltage spikes at the leading edge and at the trailing edge of each signal and for causing one of said spikes to actuate one of said generators, and the other of said spikes to actuate the other of said generators.

8. A shift register as claimed in claim 7 in which means actuated by a code signal is provided for storing a "baud" in the first core in order in one of said lines.

9. A shift register as claimed in claim 8 in which the last mentioned means includes means responsive to the length of a code signal for storing a "zero" in said first core when the signal is relatively short, and for storing a "one" in said first core when the signal is relatively long.

10. Code storage apparatus comprising a magnetic shift register having a first and a second line of cores, said cores having shift, input and output windings, means actuated by a signal and including an input winding on the first core in order of one of said lines for inserting a "baud" in said first core, means actuated at the trailing edge of said signal for providing a shift current pulse through said shift windings on said cores of said one line for shifting through the output winding on said first core and the input winding on the first core in order of the other of said lines of cores, said "baud" into said first core of said other line, and means actuated at the leading edge of a second signal for providing a shift current pulse through said shift windings on said cores of said other line for shifting through the output winding on said first core of said other line and the input winding on the second core in order of said one line, said "baud" into said second core.

11. Code storage apparatus as claimed in claim 10 in which the first mentioned means includes means responsive to the length of a signal for inserting a "zero" into said first core of said one line when the signal is relatively short, and for inserting a "one" into said last mentioned core when the signal is relatively long.

12. Code storage apparatus as claimed in claim 11 in which means actuated by the second signal stores a second "baud" in said first core of said one line.

13. Code storage apparatus as claimed in claim 10 in which means actuated by the second signal stores a "baud" in said first core of said one line.

14. Code storage apparatus comprising a magnetic shift register having a first and a second line of cores, said cores having shift, input and output windings, means responsive to a first code signal and including the input winding on the first core in order of said first line and including means responsive to the duration of the signal for inserting a "zero" in said first core when the signal is relatively short, and for inserting a "one" in said first core when the signal is relatively long, means actuated at the trailing edge of said signal for passing a shift current pulse through said shift windings of said first line for shifting the information stored in said first core through the output winding on said first core and the input winding on the first core in order of said second line into said last mentioned core, and means including means actuated at the trailing edge of said signal for clearing said register of information stored therein when the interval following said signal before a second signal appears exceeds a predetermined interval.

15. Code storage apparatus as claimed in claim 14 in which the said means for clearing the register includes means for passing a shift current pulse through said shift windings on said cores of said second line having an amplitude smaller than that of said first mentioned shift pulse.

16. Code storage apparatus as claimed in claim 15 in which the means for clearing the register includes a normally cut-off electronic amplifier having an anode connected to said last mentioned shift windings, said amplifier having a control electrode, includes a capacitor connected to said electrode, and includes means actuated at the trailing edge of the signal for starting the charging of the capacitor.

17. A magnetic shift register comprising a line of storage cores, a line of temporary storage cores, shift windings on said cores, a first shift current generator for supplying a shift current pulse to the shift windings on one of said lines of cores, a second shift current generator for supplying a shift current pulse to the shift windings on the other of said line of cores, means actuated at the leading edge of a signal pulse for energizing said first generator, means actuated at the trailing edge of the same signal for energizing said second generator, a third shift current generator for supplying a shift current pulse to said shift windings on said other line of cores, and means for energizing said third generator when the period between successive signal pulses exceeds a predetermined period.

18. A magnetic shift register as claimed in claim 17 in which the means for energizing said second generator includes means for inverting the code signal, and includes means actuated at the leading edge of the inverted code signal pulse.

References Cited in the file of this patent

UNITED STATES PATENTS

| Number | Name | Date |
|---|---|---|
| 1,612,014 | Hinrichsen | Dec. 28, 1926 |
| 2,123,459 | Anderson | July 12, 1938 |
| 2,649,502 | Odell | Aug. 18, 1953 |
| 2,654,080 | Browne | Sept. 29, 1953 |